United States Patent
Abrahams et al.

(10) Patent No.: US 9,836,293 B2
(45) Date of Patent: Dec. 5, 2017

(54) INTEGRATED LOG ANALYZER

(71) Applicant: INTERNATIONAL BUSINESS MACHINES CORPORATION, Armonk, NY (US)

(72) Inventors: Faried Abrahams, Laytonsville, MD (US); Geetha Adinarayan, Bangalore (IN); Raman Harishankar, Blacklick, OH (US); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 14/836,334

(22) Filed: Aug. 26, 2015

(65) Prior Publication Data
US 2017/0060551 A1 Mar. 2, 2017

(51) Int. Cl.
*G06F 11/34* (2006.01)
*G06F 9/45* (2006.01)

(52) U.S. Cl.
CPC . *G06F 8/53* (2013.01); *G06F 8/52* (2013.01)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS

| 7,555,683 | B2 | 6/2009 | Gronemeyer et al. |
| 7,912,878 | B2 | 3/2011 | Hazlewood et al. |
| 8,175,863 | B1 * | 5/2012 | Ostermeyer ........ G06F 17/5009 703/13 |
| 8,799,870 | B2 | 8/2014 | Maclellan et al. |
| 8,959,074 | B2 | 2/2015 | Siddiqui et al. |
| 8,959,633 | B1 | 2/2015 | Dokey et al. |
| 2006/0270429 | A1 * | 11/2006 | Szymanski ............ H04W 4/12 455/518 |
| 2014/0331234 | A1 * | 11/2014 | Gibson ................ G06F 1/3206 718/103 |

OTHER PUBLICATIONS

Martino et al., LogDriver A Tool for Measuring Resilience of Extreme-Scale Systems and Applications, 2015.*
Oliner et al., Advances and Challenges in Log Analysis, 2012.*

* cited by examiner

*Primary Examiner* — H S Sough
*Assistant Examiner* — Zhan Chen
(74) *Attorney, Agent, or Firm* — Schmeiser, Olsen & Watts; William H. Hartwell

(57) ABSTRACT

A method and system for automatically integrating component logs is provided. The method includes retrieving from a software application, high level log identification values representing transactions executed by the software application. Compiled machine language identification values representing compiled code associated with the software application and the hardware device are retrieved from an agent and a high level log identification value of the high level log identification values is identified. The high level log identification value is associated with an instruction set processed by a central processing unit (CPU). An instruction set identification value is correlated with the compiled machine language identification values. The compiled machine language identification values are converted into decompiled machine language identification values and the decompiled machine language identification values are correlated with log levels associated with the high level log identification values.

16 Claims, 5 Drawing Sheets

INTEGRATED LOG ANALYZER

FIELD

The present invention relates generally to a method for integrating application and chip level generated logs and in particular to a method and associated system for correlating transaction IDs and machine language IDs associated with the application and chip level generated logs.

BACKGROUND

Cloud based workload systems may be executed by any server comprising any capacity. For example, a mobile application illustrating a latest score or status with respect to a sporting event may be required to be running constantly within a cloud environment. If a malfunction is detected, a cause may be related to various portions of the system including an application, middleware software, an operation. Additionally with respect to critical applications, malfunction detection typically occurs after an application is disabled. Accordingly, there exists a need in the art to overcome at least some of the deficiencies and limitations described herein above.

SUMMARY

A first aspect of the invention provides a component log integration method comprising: executing, by one or more computer processors of a computing system, a software application; retrieving, by at least one of the one or more computer processors, from the software application, high level log identification values representing transactions executed by the software application; retrieving, by at least one of the one or more computer processors, from an agent within a hardware device, compiled machine language identification values representing compiled code associated with the software application and the hardware device; identifying, by at least one of the one or more computer processors, at least one high level log identification value of the high level log identification values, wherein the at least one high level log identification value is associated with at least one instruction set processed by at least one central processing unit (CPU); correlating, by at least one of the one or more computer processors, at least one instruction set identification value of the at least one instruction set with the high level log identification values and the compiled machine language identification values; converting, by at least one of the one or more computer processors, within a mediation layer of the at least one CPU, the compiled machine language identification values into decompiled machine language identification values; additionally correlating, by at least one of the one or more computer processors, the decompiled machine language identification values with log levels associated with the high level log identification values; and generating, by at least one of the one or more computer processors, based on results of the additionally correlating, a trend analysis associated with a machine cycle response of the at least one CPU.

A second aspect of the invention provides a computing system comprising a computer processor coupled to a computer-readable memory unit, the memory unit comprising instructions that when executed by the computer processor implements a component log integration method comprising: executing, by at least one of the one or more computer processors, a software application; retrieving, by at least one of the one or more computer processors, from the software application, high level log identification values representing transactions executed by the software application; retrieving, by at least one of the one or more computer processors, from an agent within a hardware device, compiled machine language identification values representing compiled code associated with the software application and the hardware device; identifying, by at least one of the one or more computer processors, at least one high level log identification value of the high level log identification values, wherein the at least one high level log identification value is associated with at least one instruction set processed by at least one central processing unit (CPU); correlating, by at least one of the one or more computer processors, at least one instruction set identification value of the at least one instruction set with the high level log identification values and the compiled machine language identification values; converting, by at least one of the one or more computer processors, within a mediation layer of the at least one CPU, the compiled machine language identification values into decompiled machine language identification values; additionally correlating, by at least one of the one or more computer processors, the decompiled machine language identification values with log levels associated with the high level log identification values; and generating, by at least one of the one or more computer processors, based on results of the additionally correlating, a trend analysis associated with a machine cycle response of the at least one CPU.

A third aspect of the invention provides a computer program product, comprising a computer readable hardware storage device storing a computer readable program code, the computer readable program code comprising an algorithm that when executed by a computer processor of a computing system implements a component log integration method comprising: executing, by at least one of the one or more computer processors, a software application; retrieving, by at least one of the one or more computer processors, from the software application, high level log identification values representing transactions executed by the software application; retrieving, by at least one of the one or more computer processors, from an agent within a hardware device, compiled machine language identification values representing compiled code associated with the software application and the hardware device; identifying, by at least one of the one or more computer processors, at least one high level log identification value of the high level log identification values, wherein the at least one high level log identification value is associated with at least one instruction set processed by at least one central processing unit (CPU); correlating, by at least one of the one or more computer processors, at least one instruction set identification value of the at least one instruction set with the high level log identification values and the compiled machine language identification values; converting, by at least one of the one or more computer processors, within a mediation layer of the at least one CPU, the compiled machine language identification values into decompiled machine language identification values; additionally correlating, by at least one of the one or more computer processors, the decompiled machine language identification values with log levels associated with the high level log identification values; and generating, by at least one of the one or more computer processors, based on results of the additionally correlating, a trend analysis associated with a machine cycle response of the at least one CPU.

The present invention advantageously provides a method and associated system capable of determining malfunctions within cloud based workload systems.

DETAILED DESCRIPTION

Figure 1:
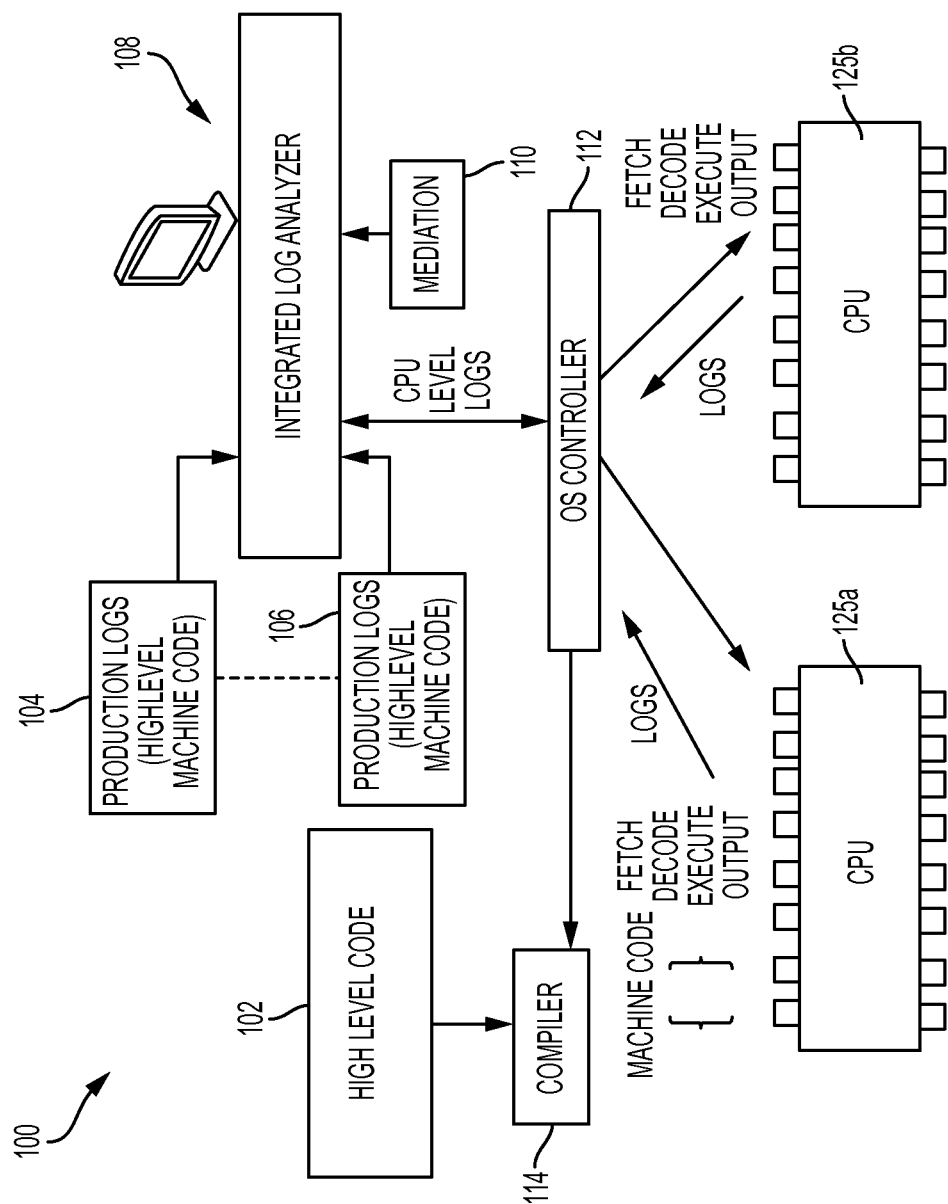
FIG. 1 illustrates a system for automatically integrating application and chip level generated logs and identifying central processing unit (CPU) and associated hardware behavior, in accordance with embodiments of the present invention.

FIG. 1 illustrates a system 100 for automatically integrating application and chip level generated logs and identifying central processing unit (CPU) and associated hardware behavior, in accordance with embodiments of the present invention. System 100 is executed such that a GUI based apparatus may be enabled to initiate log integration. Additionally, machine and software IDs may be correlated with respect to differing layers of system 100. System 100 may comprise workload/application software being executed with respect to several software and hardware components.

System 100 of FIG. 1 includes an integrated log analyzer hardware component 108 and a compiler component 114 (retrieving high level code 102) connected through an operating system controller 112 to a central processing unit (CPU) 125a and a CPU 125b. Integrated log analyzer hardware component 108 comprises a GUI based hardware component. Integrated log analyzer hardware component 108 analyzes low level hardware generated alerts and logs (i.e., production logs 104 and 106 and mediation data 110) to detect any hardware related outages and/or real time speed issues with respect to streaming analytics. The streaming analytics record a baseline reading with respect to instruction execution at a CPU level. The baseline reading is compared to a current instruction execution at the CPU level to determine the hardware related outages and/or real time speed issues.

Figure 2:
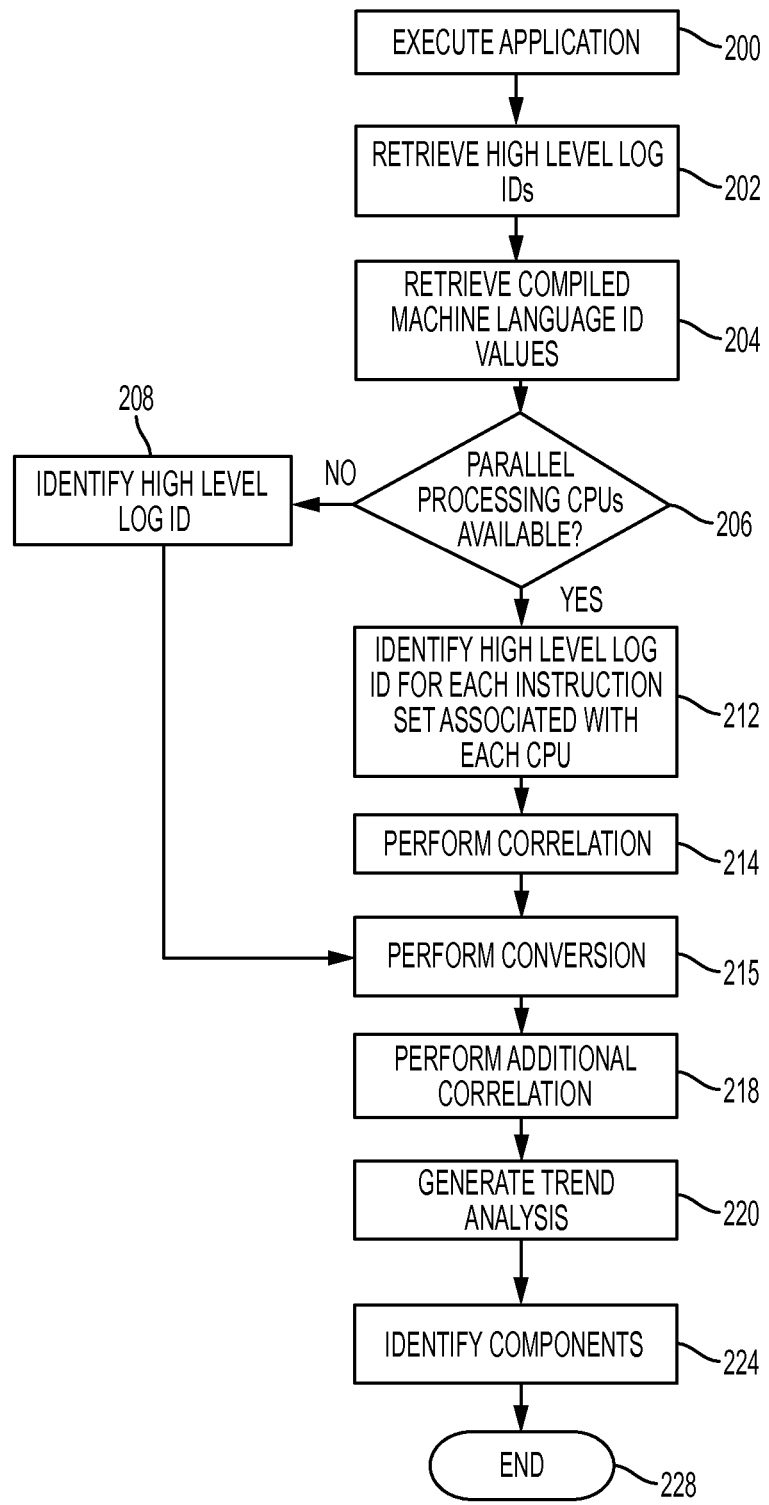
FIG. 2 illustrates an algorithm detailing a process flow enabled by the system of FIG. 1 for automatically integrating application and chip level generated logs and identifying CPU and associated hardware behavior, in accordance with embodiments of the present invention.

FIG. 2 illustrates an algorithm detailing a process flow enabled by system 100 of FIG. 1 for automatically integrating application and chip level generated logs and identifying CPU and associated hardware behavior, in accordance with embodiments of the present invention. Each of the steps in the algorithm of FIG. 2 may be enabled and executed in any order by a computer processor(s) executing computer code. In step 200, a software application is executed or launched, in step 202, high level log identification values representing transactions executed by the software application are extracted from the software application. In step 204, compiled machine language identification values representing compiled code associated with the software application and a hardware device (executing the software application) are retrieved. The compiled machine language identification values are retrieved from an agent within the hardware device. In step 206, it is determined if parallel processing CPUs are currently being executed with respect to the software application. For example, the parallel processing CPUs may be a first CPU and a second CPU forming a single CPU, the first CPU and second CPU executing parallel processing with respect to a first instruction set of said at least one instruction set and a second instruction set of said at least one instruction set. If in step 206, it is determined that parallel processing CPUs are not currently being executed with respect to the software application then in step 208, a high level log identification value (of the high level log identification values of step 202) associated with an instruction set (processed by a single CPU) is identified and step 215 is executed as described, infra. If in step 206, it is determined that parallel processing CPUs are currently being executed with respect to the software application then in step 212, a high level log identification value (of the high level log identification values of step 202) is identified for each instruction set processed by each of the parallel processing CPUs. In step 214, an instruction set identification value for each instruction set (of step 212) is correlated with each high level log identification value and the compiled machine language identification values. In step 215, the compiled machine language identification values (of step 204) are converted (within a mediation layer of the CPU(s)) into decompiled machine language identification values. In step 218, the decompiled machine language identification values are correlated with log levels associated with the high level log identification values. In step 220, a trend analysis associated with a machine cycle response of the CPU(s) is generated based on results of the correlation of step 218. The trend analysis may be enabled (by a GUI based interface) such that an integrated view of the trend analysis is displayed. The integrated view enables a user to view the transactions and machine cycle response for identifying malfunctions associated with the hardware device and or the CPU(s). Additionally, alerts or notifications based on the trend analysis may be generated. In step 224, components of the hardware device associated with the transactions are identified and associated with the CPU(s) and machine language identification values. The process is terminated in step 228.

Figure 3:
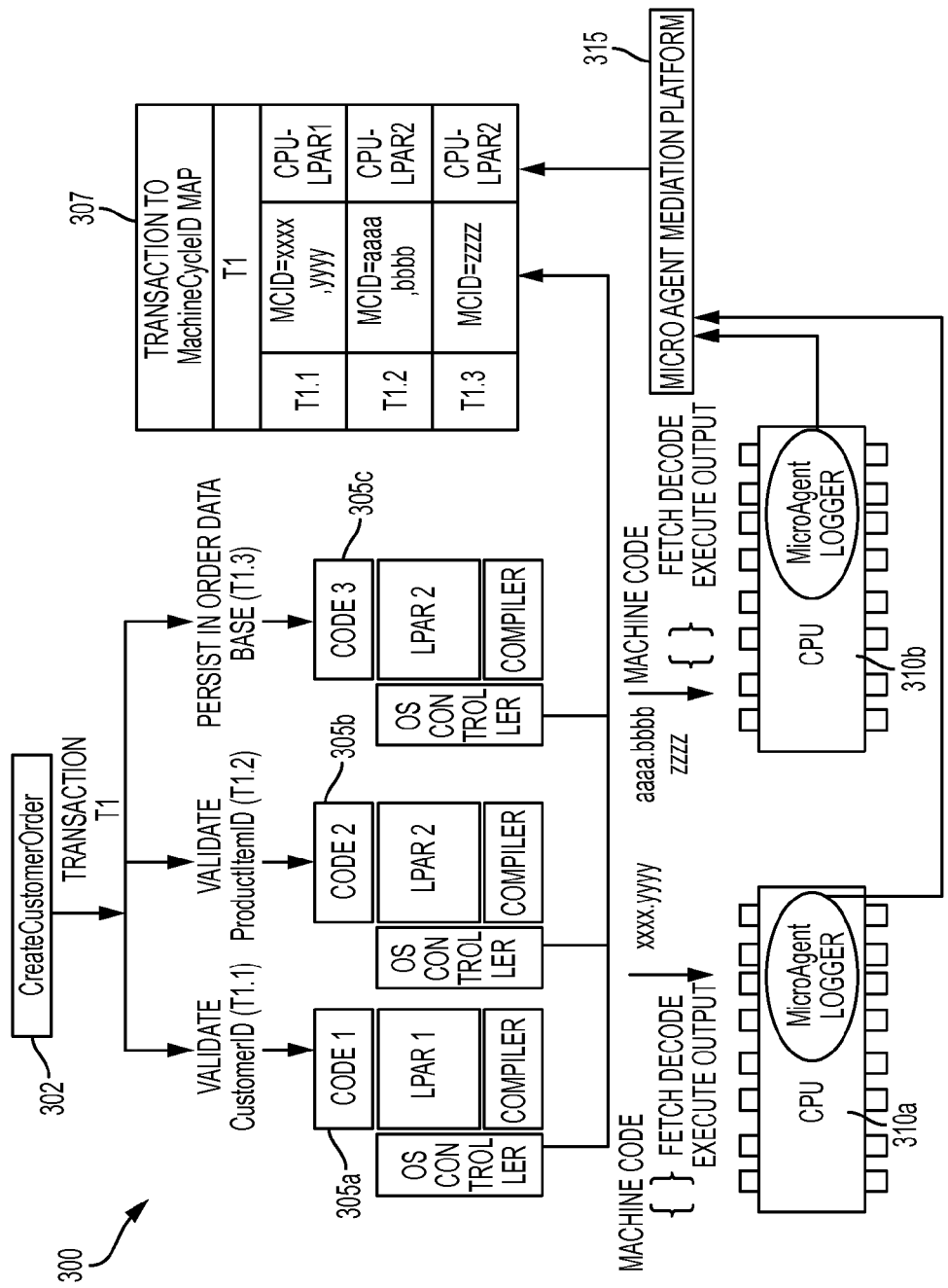
FIG. 3 illustrates a system for automatically integrating application and chip level generated logs, in accordance with embodiments of the present invention.

FIG. 3 illustrates a system 300 for automatically integrating application and chip level generated logs, in accordance with embodiments of the present invention. System 100 is executed such that a transaction 302 "createcustomerorder" received by a queue manager includes a transaction engine assigned an ID T1 and is decomposed into the following sub-transactions:

1. ValidateCustomerID—T1.1
2. ValidateProductItemID—T1.2
3. PersistOrder—T1.3

Sub-transactions T1.1 and T1.2 comprise parallel transactions and associated load balancer components 305a and 305b that include assigned IDs: LPAR1 and LPAR2, respectively. System 300 logs all IDs for sub-transactions T1.1, T1.2, and T1.3 (associated with load balancer component 305c) into a transaction to MachineCycleID map 307. Sub-transaction T1.3 comprises a nested transaction that is dependent on sub-transactions T1.1 and T1.2. Load balancer component 305c is assigned sub-transactions T1.3 with respect to assigned ID: LPAR2. In response, LPAR2 is logged into transaction to MachineCycleID map 307. Sub-transactions T1.1, T1.2, and T1.3 are decomposed as follows:

1. Sub-transaction T1.1 is decomposed into 2 machine cycles (Machine Cycle IDs xxxx, yyyy) and is executed by CPU 310a. System 300 retrieves an associated log from a micro agent mediation platform component 315 and logs into transaction to MachineCycleID map 307.

2. Sub-transaction T1.2 is decomposed into 2 machine cycles (Machine Cycle IDs aaaa, bbbb) and is executed by CPU 310b. System 300 retrieves an associated log from micro agent mediation platform component 315 and logs into transaction to MachineCycleID map 307.

3. Sub-transaction T1.3 is decomposed into 1 machine cycle (Machine Cycle ID zzzz) and is executed by CPU 310b. System 300 retrieves an associated log from micro agent mediation platform component 315 and logs into transaction to MachineCycleID map 307.

Figure 4:
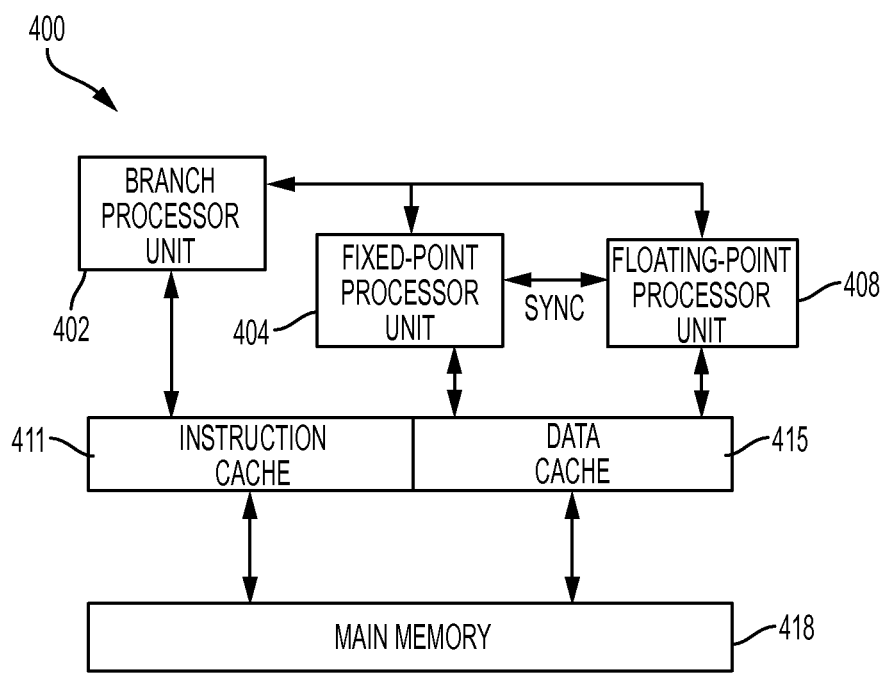
FIG. 4 illustrates a micro agent platform system for integrating logs from upper layers with respect to hardware generated logs, in accordance with embodiments of the present invention.

FIG. 4 illustrates a micro agent platform system 400 for integrating logs from upper layers with respect to hardware generated logs, in accordance with embodiments of the present invention. Micro agent platform system 400 comprises a branch processor unit 402, a fixed point processor unit 404, and a floating point processor unit 408 connected through an instruction cache 411 and a data cache 415 to a main memory unit 418. Branch processor unit 402 fetches instructions, executes branch instructions, and dispatches instructions for fixed point processor unit 404 and floating point processor unit 408. Fixed point processor unit 404 executes fixed point instructions and computes addresses for floating point loads for storage in main memory unit 418. Floating point processor unit 408 executes floating point instructions and manages data for floating point loads for storage in main memory unit 418. System 100 enables synchronization between fixed point processor unit 404 and floating point processor unit 408 thereby ensuring integrity of associations between data and associated instructions.

Figure 5:
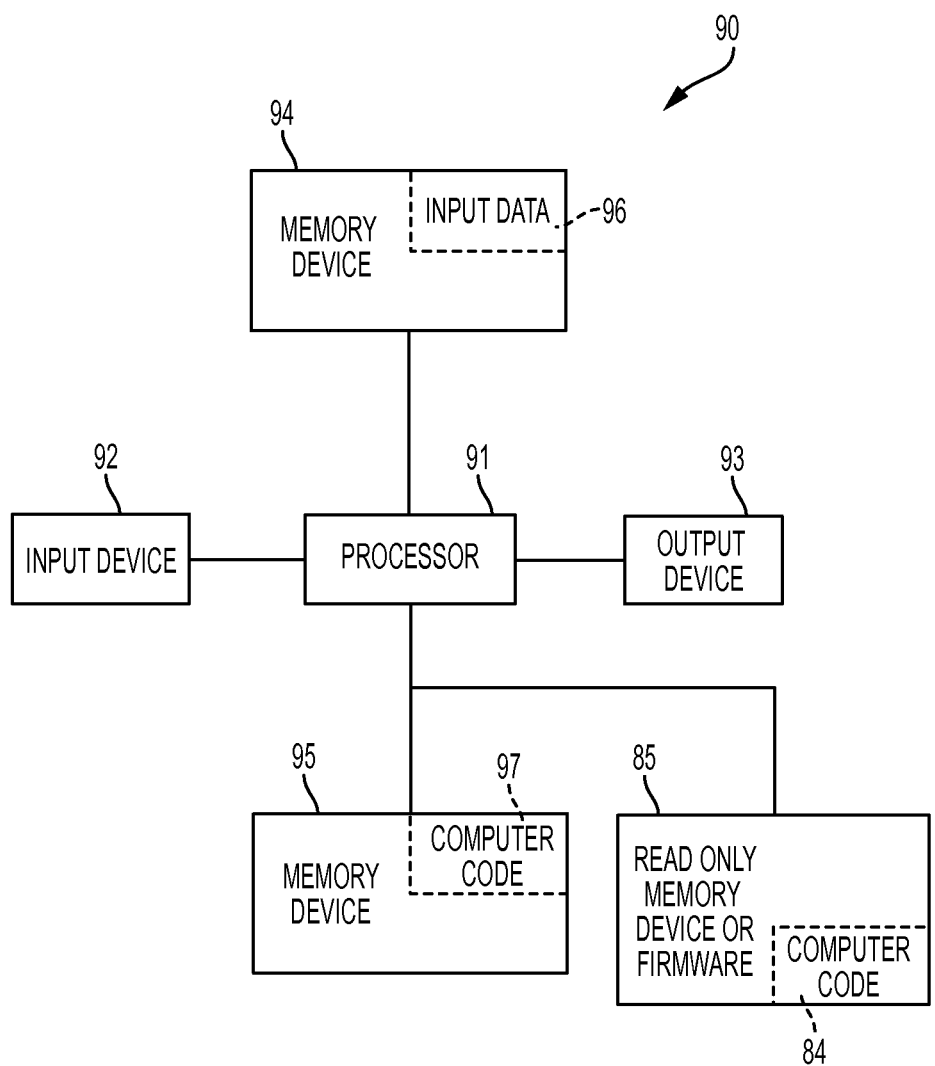
FIG. 5 illustrates a computer system for enabling a process for automatically integrating application and chip level generated logs, in accordance with embodiments of the present invention.

FIG. 5 illustrates a computer system 90 for enabling a process for automatically integrating application and chip level generated logs, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling a process for automatically integrating application and chip level generated logs. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 may be stored on a static, nonremovable, read-only storage medium such as a Read-Only Memory (ROM) device 85, or may be accessed by processor 91 directly from such a static, nonremovable, read-only memory device 85. Similarly, in some embodiments, stored computer program code 84 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for automatically integrating application and chip level generated logs. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for automatically integrating application and chip level generated logs. In another embodiment, the invention provides a business method that performs the process steps of the invention on a subscription, advertising, and/or fee basis. That is, a service supplier, such as a Solution Integrator, could offer to allow users to enable a process for automatically integrating application and chip level generated logs. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A component log integration method comprising:
   executing; by one or more computer processors of a computing system, a software application;
   retrieving, by at least one of the one or more computer processors, from said software application, high level log identification values representing transactions executed by said software application;
   retrieving, by at least one of the one or more computer processors, from an agent within a hardware device, compiled machine language identification values representing compiled code associated with said software application and said hardware device;

identifying, by at least one of the one or more computer processors, at least one high level log identification value of said high level log identification values, wherein said at least one high level log identification value is associated with at least one instruction set received from at least one of the one or more computer processors and processed by at least one central processing unit (CPU), wherein said at least one CPU comprises a first CPU and a second CPU executing parallel processing with respect to a first instruction set of said at least one instruction set and a second instruction set of said at least one instruction set;

correlating, by at least one of the one or more computer processors, at least one instruction set identification value of said at least one instruction set with said high level log identification values and said compiled machine language identification values;

converting, by at least one of the one or more computer processors, within a mediation layer or said at least one CPU, said compiled machine language identification values into decompiled machine language identification values;

generating, by at least one of the one or more computer processors, a chip level generated log associated with hardware functions of said at least one CPU;

additionally correlating, by at least one of the one or more computer processors, said decompiled machine language identification values with log levels associated with said high level log identification values and said chip level generated log;

generating, by at least one or the one or more computer processors, based on results of said additionally correlating, a trend analysis associated with a machine cycle response of said at least one CPU; and determining, by at least one of the one or more computer processors, based on said machine cycle response or said at least one CPU, hardware related outages and malfunctions related to said at least one CPU.

2. The method of claim 1, further comprising:
determining, by at least one of the one or more computer processors, that said at least one CPU is comprised by a cloud based system; and tagging, by at least one of the one or more computer processors, virtual hidden compiled machine language identification values associated with said compiled machine language identification values.

3. The method of claim 1, wherein said mediation layer comprises an interface to an upper layer of said at least one CPU.

4. The method of claim 1, further comprising:
identifying, by at least one of the one or more computer processors, components of said hardware device associated with said transactions; and associating, by at least one of the one or more computer processors, said components with said at least one CPU and said decompiled machine language identification values.

5. The method of claim 1, further comprising:
retrieving, by at least one of the one or more computer processors, directly from said at least one CPU, said high level log identification values.

6. The method of claim 1, further comprising:
retrieving, by at least one of the one or more computer processors, directly from said at least one CPU, said high level log identification values from a common platform.

7. The method of claim 1, further comprising:
associating, by at least one of the one or more computer processors, said high level log identification values with logs associated with said transactions.

8. The method of claim 1, further comprising:
enabling, by at least one of the one or more computer processors executing a GUI based interface, an integrated view of said trend analysis, wherein said integrated view enables a user to view said transactions and said machine cycle response for identifying malfunctions associated with said hardware device.

9. The method of claim 1, further comprising:
generating, by at least one of the one or more computer processors, alerts or notifications based on said trend analysis.

10. The method of claim 1, further comprising:
providing at least one support service for at least one of creating, integrating, hosting, maintaining, and deploying computer-readable code in the computing system, said code being executed by the computer processor to implement: said retrieving said high level log identification values, said retrieving said compiled machine language identification values, said identifying, said correlating, said converting, said additionally correlating, and said generating.

11. A computing system comprising a computer processor coupled to a computer-readable memory unit, said memory unit comprising instructions that when executed by the computer processor implements a component log integration method comprising:

executing, by at least one of the one or more computer processors, a software application; retrieving, by at least one of the one or more computer processors, from said software application, high level log identification values representing transactions executed by said software application;

retrieving, by at least one of the one or more computer processors, from an agent within a hardware device, compiled machine language identification values representing compiled code associated with said software application and said hardware device;

identifying, by at least one of the one or more computer processors, at least one high level log identification value of said high level log identification values, wherein said at least one high level log identification value is associated with at least one instruction set received from at least one of the one or more computer processors and processed by at least one central processing unit (CPU), wherein said at least one CPU comprises a first CPU and a second CPU executing parallel processing with respect to a first instruction set of said at least one instruction set and a second instruction set of said at least one instruction set;

correlating, by at least one of the one or more computer processors, at least one instruction set identification value of said at least one instruction set with said high level log identification values and said compiled machine language identification values;

converting, by at least one of the one or more computer processors, within a mediation layer of said at least one CPU, said compiled machine language identification values into decompiled machine language identification values;

generating, by at least one of the one or more computer processors, a chip level generated log associated with hardware functions of said at least one CPU;

additionally correlating, by at least one of the one or more computer processors, said decompiled machine language identification values with log levels associated with said high level log identification values and said chip level generated log;

generating, by at least one of the one or more computer processors, based on results of said additionally correlating, a trend analysis associated with a machine cycle response of said at least one CPU; and determining, by at least one of the one or more computer processors, based on said machine cycle response of said at least one CPU, hardware related outages and malfunctions related to said at least one CPU.

12. The computing system of claim 11, wherein said method further comprises:

determining, by at least one of the one or more computer processors, that said at least one CPU is comprised by a cloud based system; and tagging, by at least one of the one or more computer processors, virtual hidden compiled machine language identification values associated with said compiled machine language identification values.

13. The computing system of claim 11, wherein said mediation layer comprises an interface to an upper layer of said at least one CPU.

14. The computing system of claim 11, wherein said method further comprises:

identifying, by at least one of the one or more computer processors, components of said hardware device associated with said transactions; and associating, by at least one of the one or more computer processors, said components with said at least one CPU and said decompiled machine language identification values.

15. The computing system of claim 11, wherein said method further comprises:

retrieving, by at least one of the one or more computer processors, directly from said at least one CPU, said high level log identification values.

16. A computer program product, comprising a computer readable hardware storage device storing a computer readable program code, said computer readable program code comprising an algorithm that when executed by a computer processor of a computing system implements a component lop integration method comprising:

executing, by at least one of the one or more computer processors, a software application;

retrieving, by at least one of the one or more computer processors, from said software application, high level log identification values representing transactions executed by said software application;

retrieving, by at least one of the one or more computer processors, from an agent within a hardware device, compiled machine language identification values representing compiled code associated with said software application and said hardware device;

identifying, by at least one of the one or more computer processors, at least one high level log identification value of said high level log identification values, wherein said at least one high level log identification value is associated with at least one instruction set received from at least one of the one or more computer processors and processed by at least one central processing unit (CPU), wherein said at least one CPU comprises a first CPU and a second CPU executing parallel processing with respect to a first instruction set of said at least one instruction set and a second instruction set of said at least one instruction set;

correlating, by at least one of the one or more computer processors, at least one instruction set identification value of said at least one instruction set with said high level log identification values and said compiled machine language identification values;

converting, by at least one of the one or more computer processors, within a mediation layer of said at least one CPU, said compiled machine language identification values into decompiled machine language identification values;

generating, by at least one of the one or more computer processors, a chip level generated log associated with hardware functions of said at least one CPU;

additionally correlating, by at least one of the one or more computer processors, said decompiled machine language identification values with log levels associated with said high level log identification values and said chip level generated log;

generating, by at least one of the one or more computer processors, based on results of said additionally correlating, a trend analysis associated with a machine cycle response of said at least one CPU; and determining, by at least one of the one or more computer processors, based on said machine cycle response of said at least one CPU, hardware related outages and malfunctions related to said at least one CPU.

* * * * *